US011333754B2

(12) United States Patent
Schmid et al.

(10) Patent No.: US 11,333,754 B2
(45) Date of Patent: May 17, 2022

(54) DETECTION OF PARKING ROW ORIENTATION (71) Applicant: VEONEER SWEDEN AB, Vargarda (SE)

(72) Inventors: Andreas Schmid, Dachau (DE); Christopher Unverdorben, Munich (DE); Christian Pfaffenzeller, Olching (DE); Hendrik Böttcher, Unterschleissheim (DE)

(73) Assignee: VEONEER SWEDEN AB, Vargarda (SE)

( * ) Notice: Subject to any disclaimer, the term of this patent is extended or adjusted under 35 U.S.C. 154(b) by 213 days.

(21) Appl. No.: 16/761,871

(22) PCT Filed: Oct. 24, 2018

(86) PCT No.: PCT/EP2018/079118
§ 371 (c)(1),
(2) Date: May 6, 2020

(87) PCT Pub. No.: WO2019/091780
PCT Pub. Date: May 16, 2019

(65) Prior Publication Data
US 2021/0190942 A1    Jun. 24, 2021

(30) Foreign Application Priority Data
Nov. 7, 2017  (EP) .................... 17200344

(51) Int. Cl.
*G01S 13/931* (2020.01)
*G01S 7/41* (2006.01)

(52) U.S. Cl.
CPC ............ *G01S 13/931* (2013.01); *G01S 7/411* (2013.01); *G01S 7/414* (2013.01); *G01S 7/415* (2013.01);
(Continued)

(58) Field of Classification Search
CPC ........ G01S 13/931; G01S 7/411; G01S 7/414; G01S 7/415; G01S 2013/93274; G01S 2013/93271; G01S 2013/9314
(Continued)

(56) References Cited

U.S. PATENT DOCUMENTS 6,418,243 B1 * 7/2002 Skoglund .............. G06T 11/003
                                                382/128
8,471,766 B2 * 6/2013 Parker ........................ G01S 5/16
                                                342/378
(Continued)

FOREIGN PATENT DOCUMENTS

DE    102013103569 A1 * 10/2013    ......... B62D 15/0285
DE    102013103569 A1    10/2017
EP       2557020 A2     2/2013

OTHER PUBLICATIONS

M. Cote, M. Cheri ET, E. Lecolinet, C. Y. Suen: ("Automatic reading of cursive scripts using a reading model and perceptual concepts", International Journal on Document Analysis and Recognition, vol. 1, 1998, pp. 3-17, DOI: 10.1007/s100320050002) (Year: 1998).*

(Continued)

*Primary Examiner* — Bernarr E Gregory
*Assistant Examiner* — Nuzhat Pervin
(74) *Attorney, Agent, or Firm* — Dickinson Wright PLLC; Steven L. Oberholtzer (57) ABSTRACT

A vehicle environmental detection system (3) in an ego vehicle (1) and having at least one detector arrangement (4, 7) and at least one control unit arrangement (15) configured to determine a slant angle of parking slots in a parking row. The detector arrangement (4, 7) is adapted to obtain a set of detections (d(k), k=1 . . . K). For each slant angle ($\alpha_n$) in a set of slant angles ($\alpha_n$, n=1 . . . N), the control unit arrangement (15) is adapted to calculate a set of slant rotated (Continued)

detections ($d_{slant}(k, \alpha_n)$, k=1 ... K) by rotating coordinates of each detection in the set of detections (d(k), k=1 ... K)) by the present slant angle ($\alpha_n$), calculate a projection profile ($P_{row}(\alpha_n)$) for the set of slant rotated detections ($d_{slant}(k,\alpha_n)$, k=1 ... K) by determining a histogram of slant rotated detection coordinates, and to calculate an entropy ($H_{row}(\alpha_n)$) associated with the calculated projection profile ($P_{row}(\alpha_n)$). The control unit arrangement (15) can determine the slant angle based on the calculated entropies ($H_{row}(\alpha_n)$, n=1 ... N).

14 Claims, 8 Drawing Sheets (52) U.S. Cl.
CPC ............... *G01S 2013/9314* (2013.01); *G01S 2013/93271* (2020.01); *G01S 2013/93274* (2020.01)

(58) Field of Classification Search
USPC ........................................................ 342/70
See application file for complete search history.

(56) References Cited

U.S. PATENT DOCUMENTS

| | | | | |
|---|---|---|---|---|
| 8,798,907 | B2* | 8/2014 | Shida | G01S 5/0072 |
| | | | | 701/301 |
| 9,390,624 | B2* | 7/2016 | Minemura | G01S 13/867 |
| 9,453,941 | B2* | 9/2016 | Stainvas Olshansky | |
| | | | | G01N 21/55 |
| 9,702,967 | B2* | 7/2017 | Luebbert | G01S 13/34 |
| 9,829,567 | B1* | 11/2017 | Davis | G01S 7/0233 |
| 9,958,541 | B2* | 5/2018 | Kishigami | G01S 13/26 |
| 10,077,045 | B2* | 9/2018 | Kiyokawa | B60T 7/042 |
| 2009/0243889 | A1* | 10/2009 | Suhr | G08G 1/168 |
| | | | | 340/932.2 |
| 2010/0283632 | A1* | 11/2010 | Kawabata | G08G 1/168 |
| | | | | 340/932.2 |
| 2012/0161983 | A1* | 6/2012 | Yao | B62D 15/0285 |
| | | | | 340/932.2 |
| 2015/0183431 | A1* | 7/2015 | Nanami | B60W 30/095 |
| | | | | 701/301 |
| 2015/0259078 | A1* | 9/2015 | Filipovic | G08B 13/19632 |
| | | | | 244/114 R |
| 2016/0171893 | A1* | 6/2016 | Chen | G01S 17/931 |
| | | | | 701/300 |
| 2021/0086370 | A1* | 3/2021 | Zhang | B25J 9/0084 |

OTHER PUBLICATIONS

M. Cote, M. Cheriet, E. Lecolinet, C.Y. Suen: "Automatic reading of cursive scripts using a reading model and perceptual concepts", IJDAR (1998) 1: 3-17, XP002781120, DOI: 10.1007/s100320050002, Chapter 5.2.1.

International Search Report and Written Opinion of PCT/EP2018/079118 dated Jan. 3, 2019.

* cited by examiner

DETECTION OF PARKING ROW ORIENTATION

CROSS-REFERENCE TO RELATED APPLICATIONS

This application is a 35 U.S.C. § 371 national phase of PCT International Application No. PCT/EP2018/079118, filed Oct. 24, 2018, which claims the benefit of priority under 35 U.S.C. § 119 to European Patent Application No. 17200344.4, filed Nov. 7, 2017, the contents of which are incorporated herein by reference in their entirety.

FIELD OF THE INVENTION

The present disclosure relates to a vehicle environmental detection system arranged to be mounted in an ego vehicle and including at least one detector arrangement and at least one control unit arrangement.

BACKGROUND

Today, one or more radar systems as well as other vehicle environmental detection systems such as for example Lidar (Light detection and ranging) and camera images, are often used in vehicles in order to detect obstacles in the surroundings. Such a radar system is usually arranged to distinguish or resolve single targets from the surroundings by using a Doppler effect in a previously well-known manner.

Apart from use for collision detector arrangements, radars as well as other vehicle environmental detection systems may for example be used for detecting available space for parking spots and assisting when parking a vehicle. When detecting available space for parking, a row of parked cars has to be automatically identified.

A method for assisting a driver of a vehicle during a parking operation is described in EP 2557020. Environmental data characterizing the environment of the vehicle are provided and evaluated with respect to at least one first object in a lateral environment and at least one second object outside the lateral environment.

When a parking spot is found, further properties have to be detected to be able to plan further maneuvers. To save time and driveway, an early knowledge of the orientation of the parking row is required.

The object of the present disclosure is thus to provide a vehicle environmental detection system arranged for providing early knowledge of the orientation of a parking row in an efficient and uncomplicated manner.

SUMMARY AND INTRODUCTORY DESCRIPTION OF EMBODIMENTS OF THE INVENTION

The above-described object is achieved by a vehicle environmental detection system arranged to be mounted in an ego vehicle and including at least one detector arrangement and at least one control unit arrangement configured to determine a slant angle of parking slots in a parking row. The detector arrangement is adapted to obtain a plurality of detections from the detector arrangement, forming a set of detections. For each slant angle in a set of slant angles, the control unit arrangement is adapted to:

calculate a set of slant rotated detections by rotating coordinates of each detection in the set of detections by the present slant angle, calculate a projection profile for the set of slant rotated detections by determining a histogram of slant rotated detection coordinates, and to calculate an entropy associated with the calculated projection profile.

The control unit arrangement is further adapted to determine the slant angle of parking slots in the parking row based on the calculated entropies.

The previously mentioned object is also achieved by a method for a vehicle environmental detection system in an ego vehicle, where the method includes obtaining a plurality of detections forming a set of detections for determining a slant angle. For each slant angle in a set of slant angles, the method further includes the steps of:

calculating a set of slant rotated detections from the set of detections and the present slant angle, calculating a projection profile for the slant rotated detections including a histogram, and calculating an entropy for the histogram.

The method further includes determining for which slant angle the entropy reaches a minimum based on the calculated entropy.

According to some aspects, the control unit arrangement is adapted to calculate the projection profile value for a j-th histogram bin according to the following equation:

$$P_{row}(j, \alpha_n) = \sum_{k=1}^{K} \begin{cases} 1 & \text{if } (j-1)W < \{x - \text{coordinate of } (d_{slant}(k, \alpha))\} < jW \\ 0 & \text{else} \end{cases},$$

where $P_{row}(\alpha_n)$ is determined by the projection profile values for j=1 . . . B, and parameters B and W are predetermined range of the histogram and width of a histogram bin respectively.

According to some aspects, the control unit arrangement is adapted to calculate the entropy for the projection profile as a function of the slant angle for each histogram according to:

$$H_{row}(\alpha_n) = -\sum_{j=1}^{B} P_{row}(j, \alpha_n) \log_2(P_{row}(j, \alpha_n))$$

where $H_{row}(\alpha_n)$ is the entropy associated with a slant angle $\alpha_n$, and B is the number of bins in the determined histogram associated with the slant angle $\alpha_n$.

According to some aspects, the control unit arrangement is adapted to calculate the set of slant rotated detections according to:

$$d_{slant}(k, \alpha) = \begin{bmatrix} \cos(\alpha) & -\sin(\alpha) \\ \sin(\alpha) & \cos(\alpha) \end{bmatrix} d(k), 1 \leq k \leq K$$

where $d_{slant}(k,\alpha)$ is the k-th slant rotated detection, rotated by the angle $\alpha$.

According to some aspects, the control unit arrangement is adapted to apply an initial rotation to the set of detections by a reference angle such that a set of rotated detections is obtained, where the control unit arrangement is adapted to calculate the sets of slant rotated detections from the set of rotated detections.

According to some aspects, the control unit arrangement is adapted to calculate the sets of rotated detections according to:

$$d_{horizontal}(k, \beta) = \begin{bmatrix} \cos(\beta) & -\sin(\beta) \\ \sin(\beta) & \cos(\beta) \end{bmatrix} d(k), 1 \leq k \leq K$$

where $d_{horizontal}(k, \beta)$ is detection d(k) rotated by the reference angle, P is the reference angle, K is the number of detections, and d(k) is a detection in the set of detections.

According to some aspects, the control unit arrangement is adapted to calculate the set of slant rotated detections according to:

$$d_{slant}(k, \alpha) = \begin{bmatrix} \cos(\alpha) & -\sin(\alpha) \\ \sin(\alpha) & \cos(\alpha) \end{bmatrix} d_{horizontal}(k, \beta), 1 \leq k \leq K$$

where $d_{slant}(k,\alpha)$ is the k-th slant rotated detection.

Other aspects of the present disclosure are disclosed in this description.

A number of advantages are obtained by embodiments of the present disclosure. For example:

Provides a reliable orientation of objects such as parked cars in an uncomplicated way.

Detection is independent of the ego vehicle's movement direction.

Detection is independent of the ego vehicle's velocity.

BRIEF DESCRIPTION OF THE DRAWINGS

The present disclosure will now be described more in detail with reference to the appended drawings, where.

DETAILED DESCRIPTION

Figure 1:
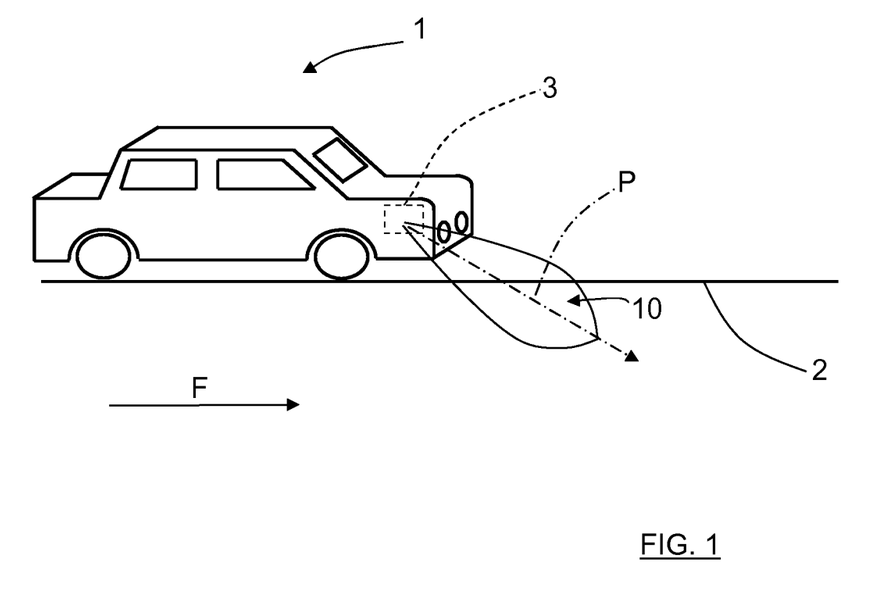
FIG. 1 shows a schematic side view of a vehicle.

FIG. 1 schematically shows a side view an ego vehicle 1 that runs on a road 2 in a movement direction F, where the vehicle 1 includes a vehicle radar system 3 which is arranged to distinguish and/or resolve single targets from the surroundings by using a Doppler effect together with analysis of received reflected signals in a previously well-known manner, i.e. successive echoes from the same point are superimposed and identified by use of the Doppler effect. The radar system is positioned on the right-hand side of the vehicle, and has a main field of view 10 that is aimed in a pointing direction P.

Figure 2:
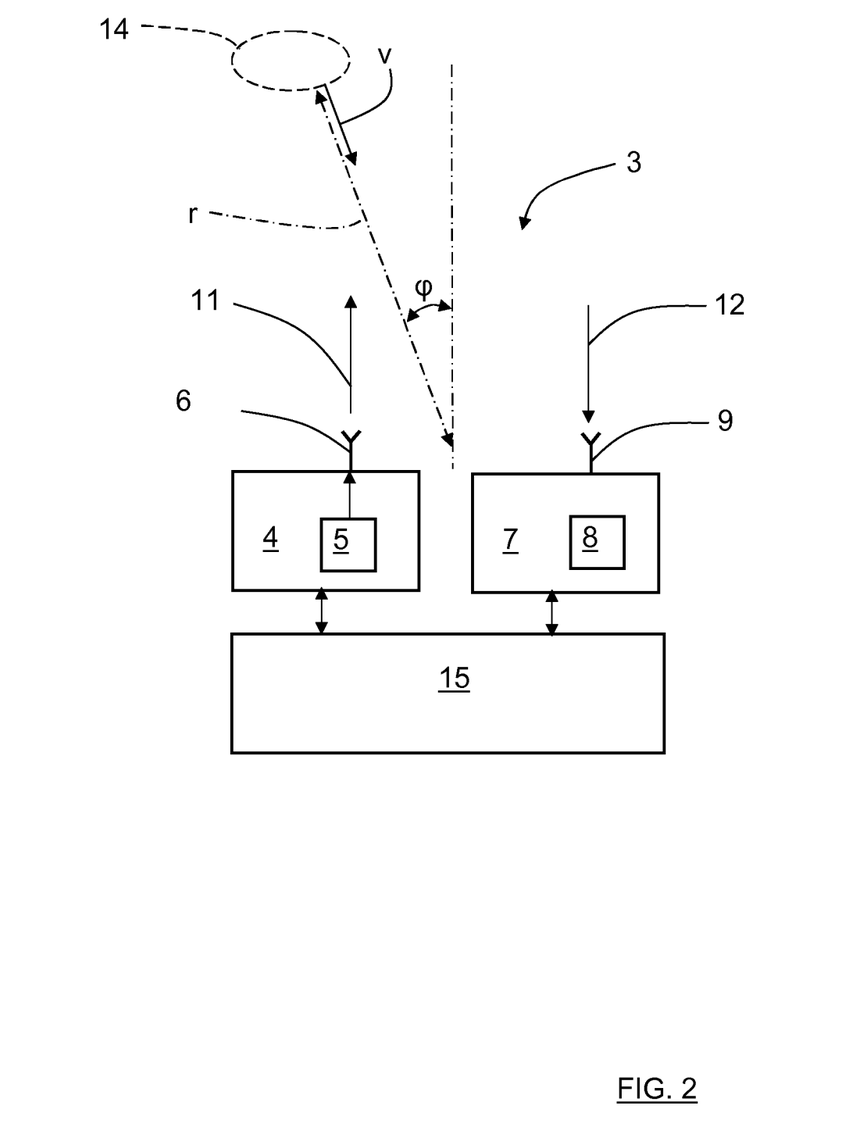
FIG. 2 shows a simplified schematic of a radar system according to the present disclosure.

With reference also to FIG. 2, the radar system 3 includes a transmitter arrangement 4 which in turn includes a signal generator 5 and a transmitter antenna arrangement 6. The vehicle radar system 3 further includes a receiver arrangement 7, which in turn includes a receiver 8 and a receiver antenna arrangement 9.

Transmitted signals 11 are reflected, and the reflected signals 12 are received by the receiver 8 via the receiver antenna arrangement 9. When in use, the transmitter antenna arrangement 6 sends a signal in the pointing direction P when the ego vehicle 1 runs past a parking 13, the radar system 3 having the certain field of view 10 that passes along the parking 13. The radar system 3 then receives echoes of the transmitted signals 11 by use of the receiver antenna arrangement 8. The field of view 10 corresponds to the beamwidth of the antenna arrangements 6, 9 in a previously known manner.

Figure 3:
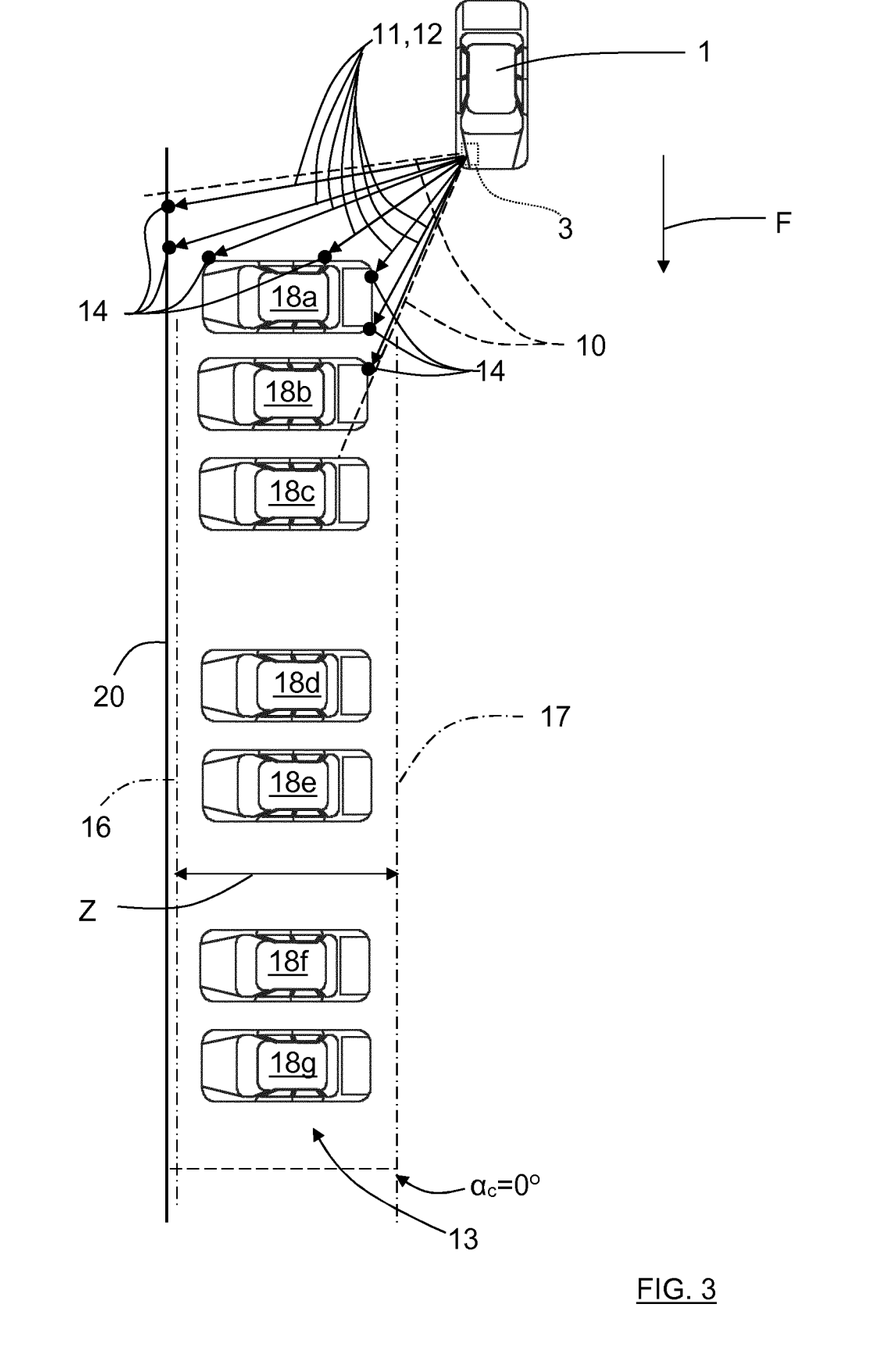
FIG. 3 shows a schematic top view of a vehicle passing a parking row with vehicles parked in a straight manner.

With reference also to FIG. 3, showing a row 13 of corresponding parked vehicles 18a, 18b, 18c, 18d, 18e, 18f, 18g, a parking row 13, the above is repeated as many times as necessary at a predetermined frequency band, while the ego vehicle 1 moves in the movement direction F, to obtain a plurality of radar detections 14.

The receiver arrangement 7 provides filtered IF (Intermediate Frequency) signals converted to digital signals to a control unit arrangement 15 including a DSP (Digital Signal Processor) functionality that is adapted for radar signal processing by use of a first FFT (Fast Fourier Transform) to convert the digital signals to a range domain, and a second FFT to combine the results from successive radar cycles into the Doppler domain in a previously well-known manner.

The control unit arrangement 15 is thus arranged to provide azimuth angles of possible target objects by simultaneously sampling and analyzing phase and amplitude of the received signals 12. Each radar detection has a certain detected azimuth angle φ, distance r and radial velocity v as schematically indicated in FIG. 2.

A parking row, i.e., a set of parking spots/spaces arranged in connection to each other, is associated with a slant angle. A slant angle of parking spots in a parking row is defined by an angle of tilt of the parking spots with respect to a baseline of the parking row or a reference line of the parking row. Different slant angles α are exemplified in FIGS. 3 and 4.

In FIG. 3, there is a first border line 16 and a second border line 17 that define a longitudinal extension of the parking row 13, where the vehicles 18a, 18b, 18c, 18d, 18e, 18f, 18g are parked in a straight manner such that there is a correct slant angle $\alpha_c$=0°. The border lines 16, 17 are separated by a distance Z and are connected by a connecting line 21 that runs at the slant angle $\alpha_c$=0°.

Figure 4:
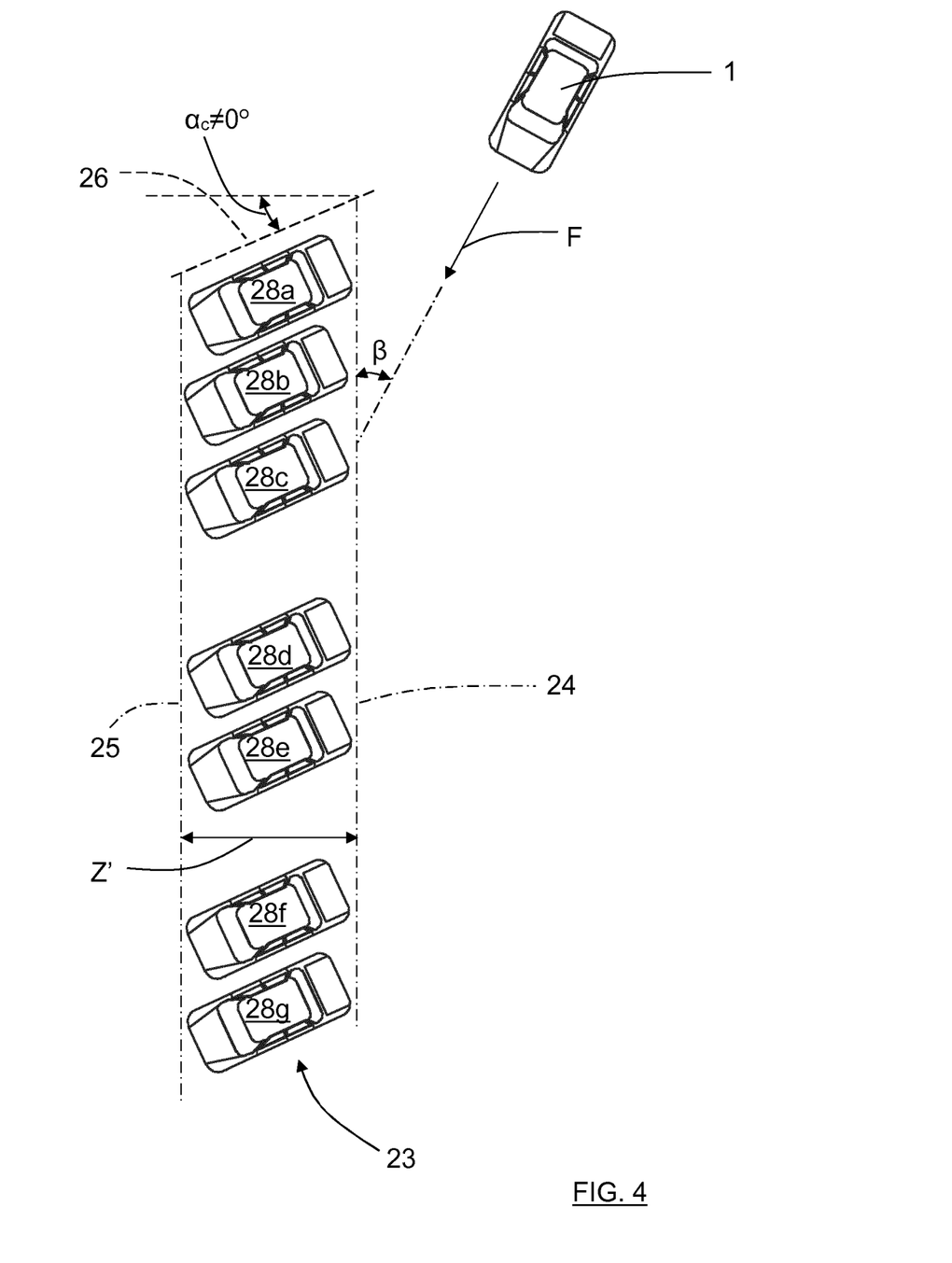
FIG. 4 shows a simplified schematic top view of a vehicle passing a parking row with vehicles parked at a slant angle.

With reference also to FIG. 4, there is a first border line 24, a second border line 25 that define a longitudinal extension of a parking row 23 in the same way as in FIG. 3. Vehicles 28a, 28b, 28c, 28d, 28e, 28f, 28g are here parked at a slant angle $\alpha_c$ relative the border lines 24, 25. In FIG. 4, the correct slant angle $\alpha_c \neq 0°$, and in accordance with the present disclosure it will now be described how the correct slant angle $\alpha_c$ is determined.

The border lines 24, 25 run parallel and at an oncome angle β relative the ego vehicle movement direction F. The border lines 24, 25 are separated by a distance Z' and are connected by a connecting line 26 that runs at a slant angle $\alpha_c$ relative the first border line 24 that is closest to the ego vehicle 1. Here, the slant angle α falls below 90° and represents an orientation of vehicles 28a, 28b, 28c, 28d, 28e, 28f, 28g which are parked at the same angle and can be determined by the detections of their lateral surface assuming a constant orientation over a parking row 23 formed between the border lines 24, 25.

In the following, there is assumed that a number K of radar detections 14 are used, such that there is a set of radar detections d(k), k=1 . . . K.

In a first step, the oncome angle β is subtracted by having all K detections in the set of radar detections d(k) initially rotated to subtract their respective orientation, such that a set of horizontal detections $d_{horizontal}(k, \beta)$, k=1 . . . K, is obtained using a rotation matrix according to:

$$d_{horizontal}(k, \beta) = \begin{bmatrix} \cos(\beta) & -\sin(\beta) \\ \sin(\beta) & \cos(\beta) \end{bmatrix} d(k), 1 \leq k \leq K$$

Subsequently, for each slant angle $\alpha_n$ in a set of slant angles $\alpha_n$, n=1 . . . N, the control unit arrangement 15 is adapted to:
- calculate a set of slant rotated detections $d_{slant}(k,\alpha)$, k=1 . . . K from the set of detections d(k), k=1 . . . K) and the present slant angle $\alpha_n$.
- calculate a projection profile $P_{row}$ for the slant rotated detections $d_{slant}(k, \alpha)$, k=1 . . . K including a histogram; and to calculate an entropy $H_{row}$ for the histogram.

Then, the control unit arrangement 15 is further adapted to determine for which slant angle $\alpha_c$ the entropy $H_{row}$ reaches a minimum based on the calculated entropy $H_{row}$.

Alternatively, the control unit arrangement 15 applies more advanced estimation methods to determine the slant angle from the determined entropies. For instance, the determined entropies can be used as estimate for different slant angle probabilities.

Each set of slant rotated detections $d_{slant}(k)$ is calculated according to:

$$d_{slant}(k, \alpha) = \begin{bmatrix} \cos(\alpha) & -\sin(\alpha) \\ \sin(\alpha) & \cos(\alpha) \end{bmatrix} d_{horizontal}(k, \beta), 1 \leq k \leq K.$$

This means that a constant bias of oncome angle β is applied to a slant angle α for each slant rotation. Rotation by first the oncome angle β and then by the slant angle α is of course the same as one rotation of a sum of these angles α+β.

Each projection profile $P_{row}$ is calculated with all B bins with the width W along the parking row 23, including all detections between the border lines 24, 25, according to the following equation:

$$P_{row}(j, \alpha) = \sum_{k=1}^{K} \begin{cases} 1 & \text{if } (j-1)W < \{x-\text{coordinate of } (d_{slant}(k, \alpha))\} < jW \\ 0 & \text{else} \end{cases},$$

where $P_{row}$ is the projection profile value for the j-th histogram bin and W is a width of a histogram bin.

W is a parameter that determines the width of each histogram bin, measured as a distance in, e.g., centimeters or inches. The pre-determined width can be set based on, e.g., the range or angle resolution of radar detection, on the width of a standard vehicle, or based on other geometrical properties of the vehicle environment.

The number of bins B in a histogram, together with the width W of each bin, determines the range of the histogram, i.e., over which values the histogram spans. For example, a histogram with ten bins, B=100, and W=10 cm spans from 0 meters up to 10 meters.

Figure 6:
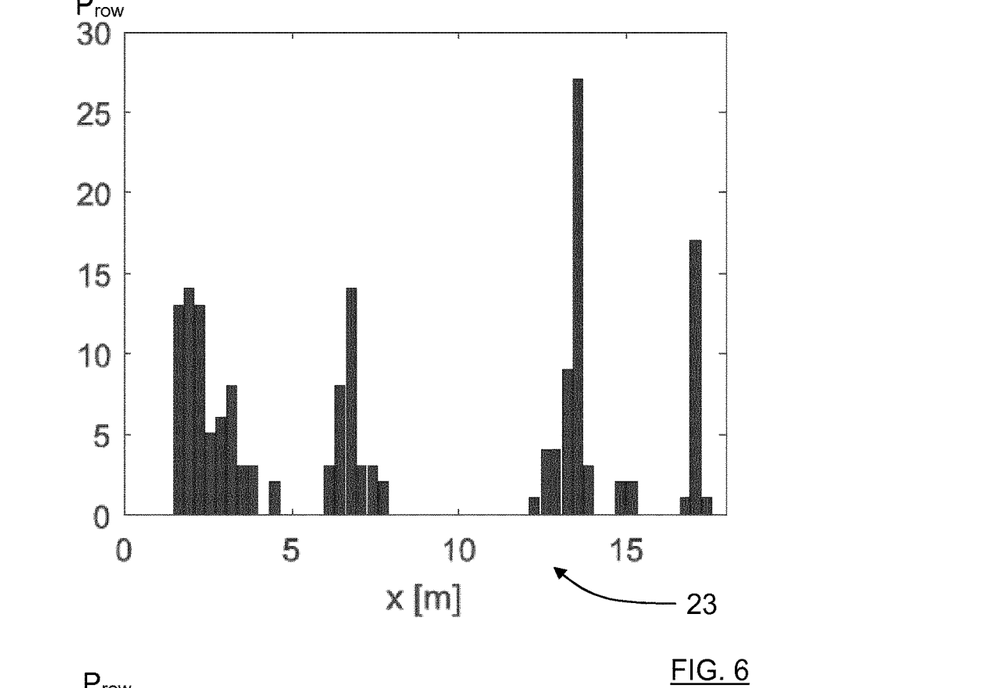
FIG. 6 shows a projection profile for a slant angle α=0°.
Figure 7:
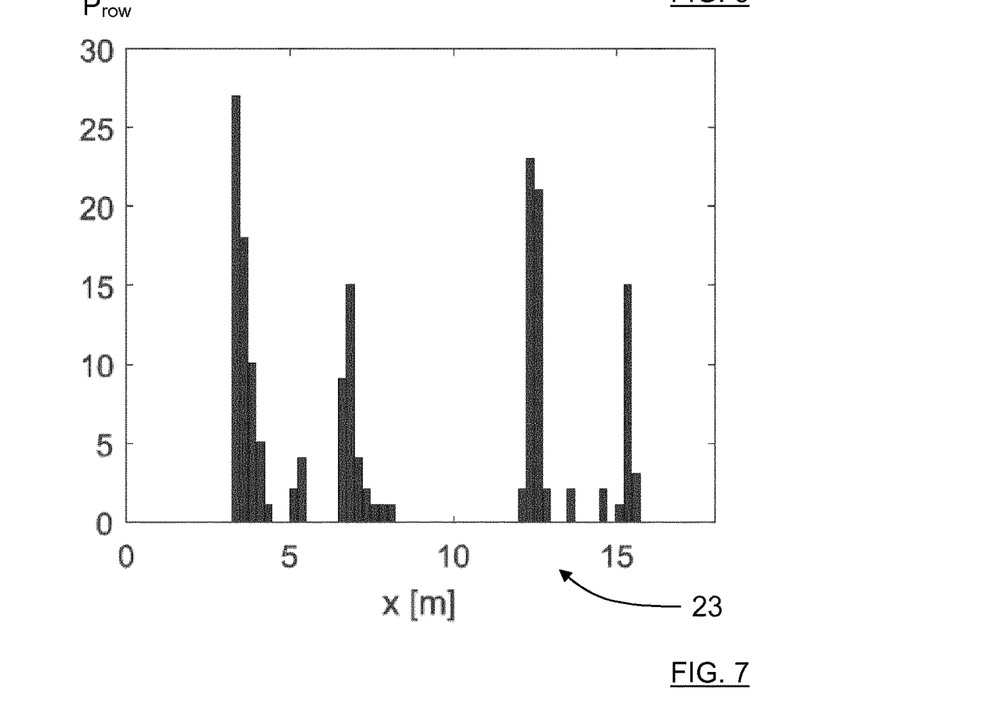
FIG. 7 shows a projection profile for a slant angle α=35°.

Each projection profile $P_{row}$ is a histogram calculated in the orientation of the parking row 23 for a slant rotated detections $d_{slant}(k)$, as shown in FIG. 6 for a slant angle $\alpha=0°$ and in FIG. 7 for the correct slant angle $\alpha_c=35°$.

The entropy $H_{row}$ for each histogram is calculated according to:

$$H_{row}(\alpha) = -\sum_{j=1}^{B} P_{row}(j, \alpha) \log_2(P_{row}(j, \alpha))$$

This summation is what builds a final histogram like the one shown in FIG. 8 as described more in detail below.

Since the number of bins has a direct influence to the value of the entropy, and these values should be compared, the bin size B has to be fixed.

Figure 8:
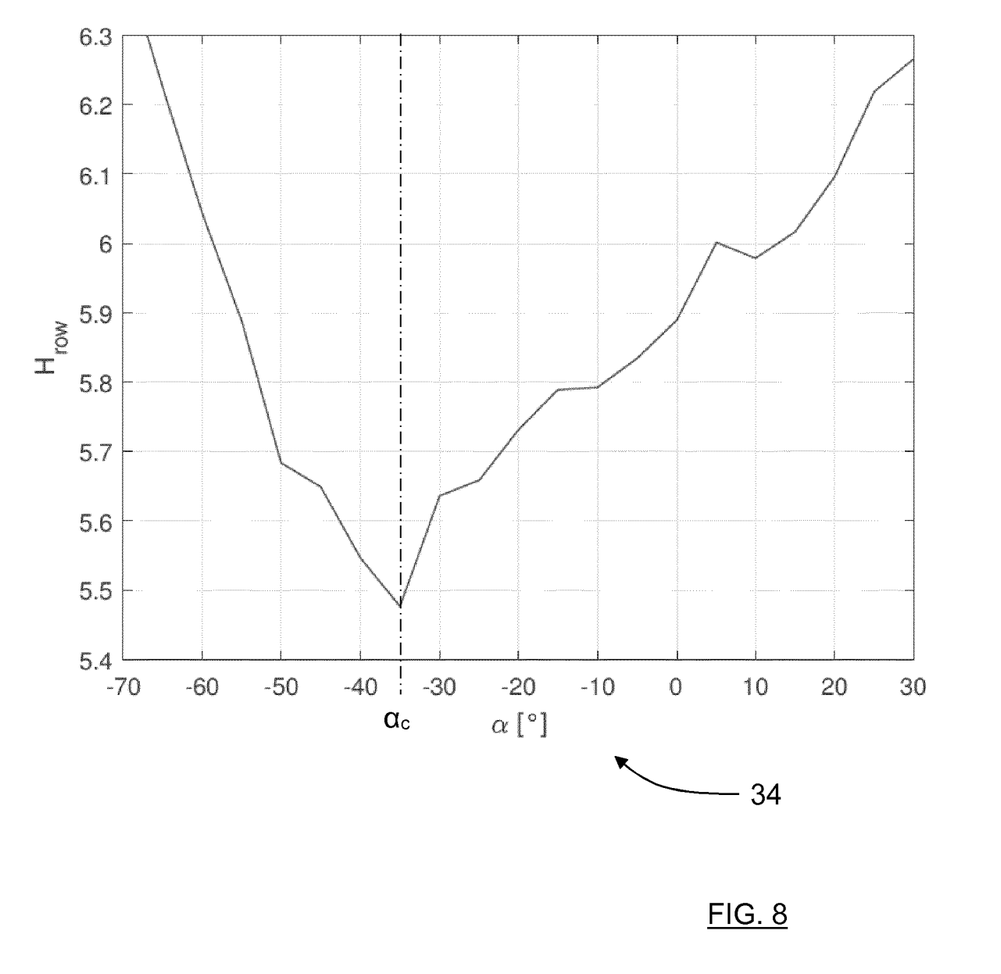
FIG. 8 shows entropy as a function of sampled slant angles.

FIG. 8 shows a graph 34 of the entropy $H_{row}$ as a function of the slant angles $\alpha_n$ sampled in steps of 5°. For the correct orientation of the parking row with a correct slant angle $\alpha_c$ of about 35°, the entropy $H_{row}$ reaches a minimum.

Figure 9:
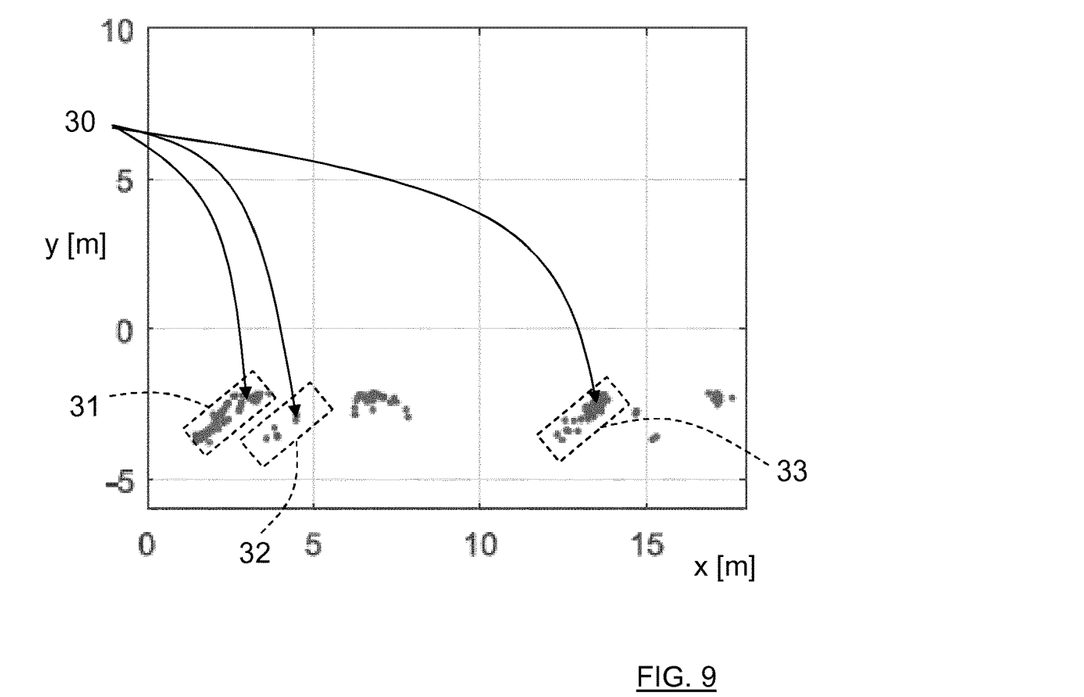
FIG. 9 shows a top view of detections without rotation.
Figure 10:
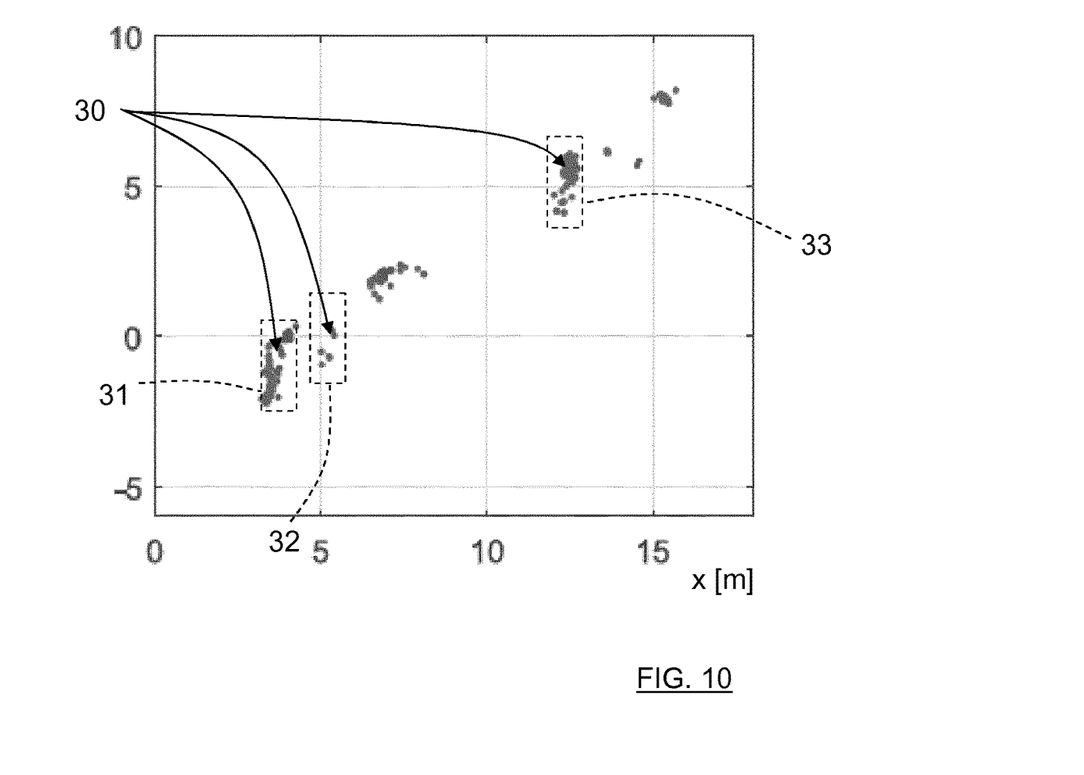
FIG. 10 shows a top view of detections rotated 36.

This can be understood from FIG. 9 and FIG. 10. In FIG. 9, a number of detections 30 according to a set of horizontal detections $d_{horizontal}(k, \beta)$, k=1 . . . K, are shown in a schematical manner, and detections belonging to three slanted vehicles 31, 32, 33 are schematically indicated in a top view.

By rotating these detections for a number of slant angles, a set of slant rotated detections $d_{slant}(k)$ is obtained. For the correct slant angle $\alpha_c=35°$, as shown in FIG. 10, the three slanted vehicles 31, 32, 33 have been oriented such that they appear vertically arranged in FIG. 10, which will result in a minimum result for the entropy of the corresponding histogram.

For reasons of clarity, only a few radar detections 14 are shown in FIG. 3, and no radar detections are shown in FIG. 4. Of course, practically, there is a multitude of radar detections forming the set initial of radar detections d(k), k=1 . . . K. According to some aspects, the detections from a radar cycle are saved in a detection memory to the next radar cycle in order to provide a better representation of the environment.

Figure 5:
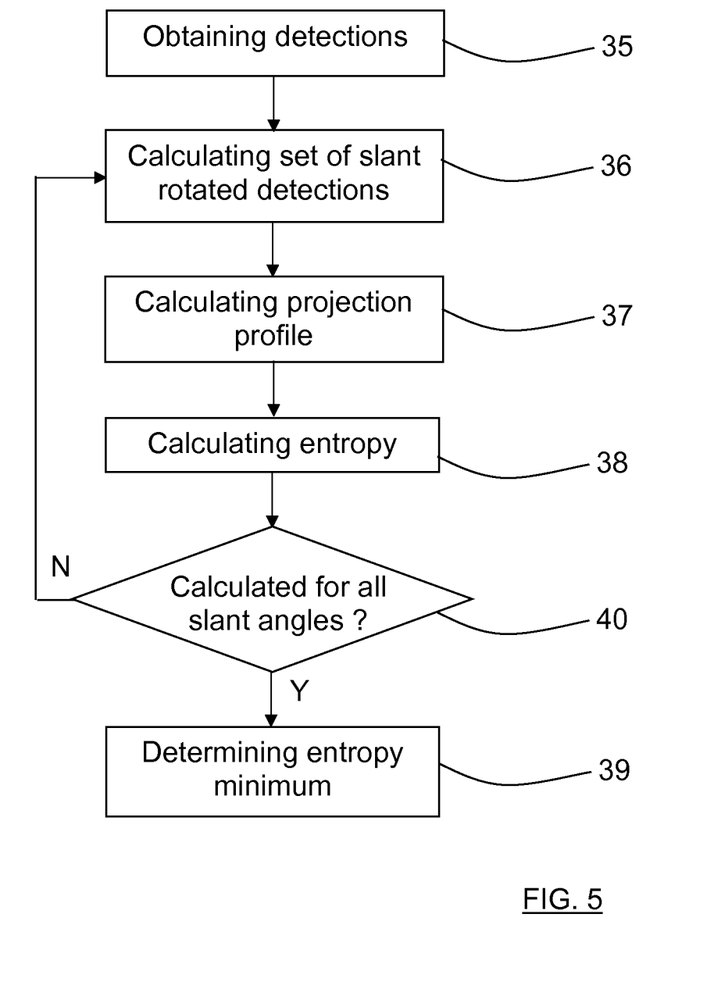
FIG. 5 shows a flowchart for a method according to the present disclosure.

With reference to FIG. 5, the present disclosure also relates to a method for a vehicle environmental detection system 3 in an ego vehicle 1. The method includes the steps of:

Step 35: Obtaining a plurality of detections 14 forming a set of detections d(k), k=1 . . . K for determining a slant angle.

For each slant angle $\alpha_n$ in a set of slant angles $\alpha_n$, n=1 . . . N, the method further includes the steps of:

Step 36: Calculating a set of slant rotated detections $d_{slant}(k,\alpha_n)$, k=1 . . . K from the set of detections d(k), k=1 . . . K and the present slant angle $\alpha_n$.

Step 37: Calculating a projection profile ($P_{row}$) for the slant rotated detections $d_{slant}(k, \alpha_n)$, k=1 . . . K including a histogram.

Step 38: Calculating an entropy $H_{row}$ for the histogram. This is repeated 40 for all slant angles in the set of slant angles $\alpha_n$, n=1 . . . N.

The method then further includes the steps of:

Step 39: Determining for which slant angle $\alpha_c$ the entropy $H_{row}$ reaches a minimum based on the calculated entropy $H_{row}$.

The present disclosure is not limited to the examples above, but may vary freely within the scope of the appended claims. For example, the radar system may be implemented in any type of vehicle such as cars, trucks and buses as well as boats and aircraft.

The initial rotation can be performed for any suitable reference angle β which need not be an oncome angle, since this only confers a reference coordinate system in which slant angles are determined. Any coordinate system can be used, for example a north-south alignment.

In fact, in order to perform the present disclosure, it is not necessary to perform an initial rotation at all. Each set of slant rotated detections $d_{slant}(k)$ is then calculated according to:

$$d_{slant}(k, \alpha) = \begin{bmatrix} \cos(\alpha) & -\sin(\alpha) \\ \sin(\alpha) & \cos(\alpha) \end{bmatrix} d(k), 1 \leq k \leq K.$$

Generally, in anyway, the set of slant rotated detections $d_{slant}(k,\alpha)$, k=1 . . . K is calculated from the initial set of detections d(k), k=1 . . . K), rotated or not.

Generally, the present disclosure relates to finding any suitable slant angle, and is not limited to a slant angle of parked vehicles.

Above, only examples have been provided of how to achieve rotating to acquire the slant rotated detections, this can of course be done in many different ways.

Similarly, only an example of entropy calculation has been provided, this can of course be calculated in many different ways.

All drawings are simplified, only showing parts that are considered relevant for an adequate description of the present disclosure. It is understood that the general design of radar systems of this kind is well-known in the art.

The constitution of the antennas included in the transmitter antenna arrangement 6 and receiver antenna arrangement 9 may be of any suitable design, such as slot antennas of patch antennas. The transmitter antenna arrangement 6 and receiver antenna arrangement 9 may be combined in one antenna arrangement that is arranged for both transmission and reception by use of, for example, time division.

Terms such as longitudinal and parallel are not to be interpreted as mathematically exact, but within what is practical in the present context. For example, the border lines have mutually longitudinal extensions and are mutually parallel, but of course smaller deviations can occur due to practical reasons.

According to some aspects, the control unit arrangement 15, includes one or several separate control units that are arranged together or in a distributed manner.

According to some aspects, the vehicle radar system 3 can be constituted by any type of suitable vehicle environmental detection system such as for example Lidar. Such a vehicle environmental detection system 3 can includes at least one detector arrangement 4, 7 at any suitable corresponding position at the vehicle, and at least one control unit arrangement 15. The detector arrangement 4, 7 is adapted to obtain a plurality of detections 14.

The movement direction F can be directed in a forward movement direction as well as in a rearward movement direction, and is generally constituted by a vehicle environmental detection system 3 movement direction F.

According to some aspects, the ego vehicle 1 does not have to be moving, but can be motionless when obtaining radar detections 14 from the parking row 13. The ego vehicle 1 may, or may not, have yet reached the parking row 13 when obtaining radar detections 14 from the parking row 13.

According to some aspects, the ego vehicle 1 can approach the parking row from any angle; each approaching angle is possible as long as the parking row is in the field of view of the radar system 3 or in a detection memory.

According to some aspects, the set of slant angles $\alpha_n$, n=1 . . . N includes a set of possible slant angles $\alpha_n$, n=1 . . . N. This set is chosen or determined in any suitable manner.

Generally, the present disclosure relates to a vehicle environmental detection system 3 arranged to be mounted in an ego vehicle 1 and including at least one detector arrangement 4, 7 and at least one control unit arrangement 15 configured to determine a slant angle of parking slots in a parking row, where the detector arrangement 4, 7 is adapted to obtain a plurality K of detections 14 from the detector arrangement 4, 7, forming a set of detections d(k), k=1 . . . K. For each slant angle $\alpha_n$ in a set of slant angles $\alpha_n$, n=1 . . . N, the control unit arrangement 15 is adapted to:

calculate a set of slant rotated detections $d_{slant}(k, \alpha_n)$, k=1 . . . K by rotating coordinates of each detection in the set of detections d(k), k=1 . . . K by the present slant angle $\alpha_n$, calculate a projection profile $P_{row}(\alpha_n)$ for the set of slant rotated detections $d_{slant}(k, \alpha_n)$, k=1 . . . K by determining a histogram of slant rotated detection coordinates; and to calculate an entropy $H_{row}(\alpha_n)$ associated with the calculated projection profile $P_{row}(\alpha_n)$;

where the control unit arrangement 15 further is adapted to determine the slant angle of parking slots in the parking row based on the calculated entropies $H_{row}(\alpha_n)$, n=1 . . . N.

According to some aspects, the control unit arrangement 15 is adapted to calculate the projection profile value for a j-th histogram bin $P_{row}(j,\alpha_n)$ according to the following equation:

$$P_{row}(j, \alpha_n) = \sum_{k=1}^{K} \begin{cases} 1 & \text{if } (j-1)W < \{x - \text{coordinate of } (d_{slant}(k, \alpha))\} < jW \\ 0 & \text{else} \end{cases},$$

where $P_{row}(\alpha_n)$ is determined by the projection profile values for j=1 . . . B, and parameters B and W are predetermined range of the histogram and width of a histogram bin respectively.

According to some aspects, the control unit arrangement 15 is adapted to calculate the entropy $H_{row}(\alpha_n)$ for the projection profile $P_{row}(\alpha_n)$, as a function of the slant angle $\alpha_n$ for each histogram according to:

$$H_{row}(\alpha_n) = -\sum_{j=1}^{B} P_{row}(j, \alpha_n) \log_2 P_{row}(j, \alpha_n)$$

where $H_{row}(\alpha_n)$ is the entropy associated with a slant angle $\alpha_n$, and B is the number of bins in the determined histogram associated with the slant angle $\alpha_n$.

According to some aspects, a majority of the plurality K of detections 14 is associated with vehicles 28a, 28b, 28c, 28d, 28e, 28f, 28g in a parking row 23, where a slant angle for which the entropy $H_{row}(\alpha_n)$ reaches a minimum is constituted by a correct slant angle $\alpha_c$ which constitutes a measure of a slant angle between a common orientation of the vehicles 28a, 28b, 28c, 28d, 28e, 28f, 28g and a reference line.

According to some aspects, the control unit arrangement 15 is adapted to calculate the set of slant rotated detections $d_{slant}(k,\alpha)$, k=1 ... K according to:

$$d_{slant}(k, \alpha) = \begin{bmatrix} \cos(\alpha) & -\sin(\alpha) \\ \sin(\alpha) & \cos\alpha \end{bmatrix} d(k), 1 \le k \le K$$

where $d_{slant}(k,\alpha)$ is the k-th slant rotated detection, rotated by the angle $\alpha$.

According to some aspects, the control unit arrangement 15 is adapted to apply an initial rotation to the set of detections d(k), k=1 ... K by a reference angle $\beta$ such that a set of rotated detections $d_{horizontal}(k, \beta)$, k=1 ... K is obtained, where the control unit arrangement 15 is adapted to calculate the sets of slant rotated detections $d_{slant}(k, \alpha_n)$, k=1 ... K from the set of rotated detections $d_{horizontal}(k, \beta)$, k=1 ... K.

According to some aspects, the reference angle $\beta$ is constituted by an oncome angle $\beta$ formed between a vehicle environmental detection system 3 movement direction F and the first border line 24.

According to some aspects, the control unit arrangement 15 is adapted to calculate the sets of rotated detections $d_{horizontal}(k, \beta)$, k=1 ... K according to:

$$d_{horizontal}(k, \beta) = \begin{bmatrix} \cos(\beta) & -\sin(\beta) \\ \sin(\beta) & \cos\beta \end{bmatrix} d(k), 1 \le k \le K$$

where $d_{horizontal}(k, \beta)$, is detection d(k) rotated by the reference angle, P is the reference angle, K is the number of detections, and $d(k, \alpha)$ is a detection in the set of detections d(k), k=1 ... K.

According to some aspects, the control unit arrangement 15 is adapted to calculate the set of slant rotated detections $d_{slant}(k, \alpha)$ according to:

$$d_{slant}(k, \alpha) = \begin{bmatrix} \cos(\alpha) & -\sin(\alpha) \\ \sin(\alpha) & \cos\alpha \end{bmatrix} d_{horizontal}(k, \beta), 1 \le k \le K$$

where $d_{slant}(k, \alpha)$ is the k-th slant rotated detection.

Generally, the present disclosure also relates to a method for a vehicle environmental detection system 3 in an ego vehicle 1, where the method includes the steps of:

Step 35: obtaining a plurality of detections 14 forming a set of detections d(k), k=1 ... K for determining a slant angle. For each slant angle $\alpha_n$ in a set of slant angles $\alpha_n$, n=1 ... N, the method further includes the steps of:

Step 36: calculating a set of slant rotated detections $d_{slant}(k, \alpha_n)$, k=1 ... K from the set of detections d(k), k=1 ... K and the present slant angle $\alpha_n$;

Step 37: calculating a projection profile $P_{row}$ for the slant rotated detections $d_{slant}(k, \alpha_n)$, k=1 ... K including a histogram; and Step 38: calculating an entropy $H_{row}$ for the histogram; where the method further includes the step of:

Step 39: determining for which slant angle $\alpha_c$ the entropy $H_{row}$ reaches a minimum based on the calculated entropy $H_{row}$.

According to some aspects, the method includes calculating the projection profile value for a j-th histogram bin $P_{row}(j, \alpha_n)$ according to the following equation:

$$P_{row}(j, \alpha_n) = \sum_{k=1}^{K} \begin{cases} 1 & \text{if } (j-1)W < \{x - \text{coordinate of } (d_{slant}(k, \alpha))\} < jW \\ 0 & \text{else} \end{cases},$$

where $P_{row}(\alpha_n)$ is determined by the projection profile values for j=1 ... B, and parameters B and W are predetermined range of the histogram and width of a histogram bin respectively.

According to some aspects, the method includes calculating the entropy $H_{row}(\alpha_n)$ for the projection profile $P_{row}(\alpha_n)$ as a function of the slant angle $\alpha_n$ for each histogram according to:

$$H_{row}(\alpha_n) = -\sum_{j=1}^{B} P_{row}(j, \alpha_n) \log_2 P_{row}(j, \alpha_n)$$

where $H_{row}(\alpha_n)$ is the entropy associated with a slant angle $\alpha_n$, and B is the number of bins in the determined histogram associated with the slant angle $\alpha_n$.

According to some aspects, a majority of the plurality K of detections 14 is associated with vehicles 28a, 28b, 28c, 28d, 28e, 28f, 28g in a parking row 23, where a slant angle for which the entropy $H_{row}(\alpha_n)$ reaches a minimum is constituted by a correct slant angle $\alpha_c$ which constitutes a measure of a slant angle between a common orientation of the vehicles 28a, 28b, 28c, 28d, 28e, 28f, 28g and a reference line.

According to some aspects, the method includes applying an initial rotation to the set of detections d(k), k=1 ... K by a reference angle $\beta$ such that a set of rotated detections $d_{horizontal}(k, \beta)$, k=1 ... K is obtained, where the control unit arrangement 15 is adapted to calculate the sets of slant rotated detections $d_{slant}(k, \alpha_n)$, k=1 ... K from the set of rotated detections $d_{horizontal}(k, \beta)$, k=1 ... K, where the sets of rotated detections $d_{horizontal}(k, \beta)$, k=1 ... K are calculated according to:

$$d_{horizontal}(k, \beta) = \begin{bmatrix} \cos(\beta) & -\sin(\beta) \\ \sin(\beta) & \cos\beta \end{bmatrix} d(k), 1 \le k \le K$$

where $d_{horizontal}(k, \beta)$ is detection d(k) rotated by the reference angle, P is the reference angle, K is the number of detections, and d(k) is a detection in the set of detections d(k), k=1 ... K, and where the set of slant rotated detections $d_{slant}(k, \alpha)$ is calculated according to:

$$d_{slant}(k, \alpha) = \begin{bmatrix} \cos(\alpha) & -\sin(\alpha) \\ \sin(\alpha) & \cos(\alpha) \end{bmatrix} d_{horizontal}(k, \beta), 1 \le k \le K$$

where $d_{slant}(k, \alpha)$ is the k-th slant rotated detection.

While the above description constitutes the preferred embodiment of the present invention, it will be appreciated that the invention is susceptible to modification, variation and change without departing from the proper scope and fair meaning of the accompanying claims.

The invention claimed is:

1. A vehicle environmental detection system arranged to be mounted in an ego vehicle and comprising at least one detector arrangement and at least one control unit arrangement configured to determine a slant angle of parking slots in a parking row, where the detector arrangement is adapted to obtain a plurality of detections from the detector arrangement, forming a set of detections (d(k), k=1 ... K), in that, for each of the slant angle ($\alpha_n$) in a set of the slant angles ($\alpha_n$, n=1 ... N), the control unit arrangement is adapted to:
calculate a set of slant rotated detections ($d_{slant}(k, \alpha_n)$, k=1 ... K) by rotating coordinates of each detection in the set of detections (d(k), k=1 ... K) by a present slant angle ($\alpha_n$),
calculate a projection profile ($P_{row}(\alpha_n)$) for the set of slant rotated detections ($d_{slant}(k,\alpha_n)$, k=1 ... K) by determining a histogram of slant rotated detection coordinates; and to
calculate an entropy ($H_{row}(\alpha_n)$) associated with the projection profile ($P_{row}(\alpha_n)$);
where the control unit arrangement further is adapted to determine the slant angle of the parking slots in the parking row based on the entropies ($H_{row}(\alpha_n)$, n=1 ... N).

2. The vehicle environmental detection system according to claim 1, further comprising the control unit arrangement is adapted to calculate the projection profile for a j-th histogram bin ($P_{row}(j, \alpha_n)$) according to the following equation:

$$P_{row}(j, \alpha_n) = \sum_{k=1}^{K} \begin{cases} 1 & \text{if } (j-1)W < \{x - \text{coordinate of } (d_{slant}(k, \alpha))\} < jW \\ 0 & \text{else} \end{cases},$$

where $P_{row}(\alpha_n)$ is determined by the projection profile values for j=1 ... B, and parameters B and W are each a pre-determined range of the histogram and width of a histogram bin respectively.

3. The vehicle environmental detection system according to claim 1, further comprising the control unit arrangement is adapted to calculate the entropy ($H_{row}(\alpha_n)$) for the projection profile ($P_{row}(\alpha_n)$) as a function of the slant angle ($\alpha_n$) for each histogram according to:

$$H_{row}(\alpha_n) = -\sum_{j=1}^{B} P_{row}(j, \alpha_n) \log_2(P_{row}(j, \alpha_n))$$

where $H_{row}(\alpha_n)$ is the entropy associated with the slant angle $\alpha_n$, and B is the number of bins in the determined histogram associated with the slant angle $\alpha_n$.

4. The vehicle environmental detection system according to claim 1, further comprising that a majority of the plurality of detections is associated with one or more vehicles in the parking row, where a slant angle for which the entropy ($H_{row}(\alpha_n)$) reaches a minimum is constituted by a correct slant angle ($\alpha_c$) which constitutes a measure of the slant angle between a common orientation of the vehicles and a reference line.

5. The vehicle environmental detection system according to claim 1, further comprising the control unit arrangement is adapted to calculate the set of slant rotated detections ($d_{slant}(k,\alpha)$, k=1 ... K) according to:

$$d_{slant}(k, \alpha) = \begin{bmatrix} \cos(\alpha) & -\sin(\alpha) \\ \sin(\alpha) & \cos(\alpha) \end{bmatrix} d(k), 1 \le k \le K$$

where $d_{slant}(k,\alpha)$ is the k-th slant rotated detection, rotated by the angle $\alpha$.

6. The vehicle environmental detection system according to claim 1, further comprising that the control unit arrangement is adapted to apply an initial rotation to the set of detections (d(k), k=1 ... K) by a reference angle ($\beta$) such that a set of rotated detections ($d_{horizontal}(k, \beta)$, k=1 ... K) is obtained, where the control unit arrangement is adapted to calculate the sets of slant rotated detections ($d_{slant}(k,\alpha_n)$, k=1 ... K) from the set of rotated detections ($d_{horizontal}(k, \beta)$, k=1 ... K).

7. The vehicle environmental detection system according to claim 6, further comprising the reference angle ($\beta$) is constituted by an oncome angle ($\beta$) formed between a vehicle environmental detection system movement direction and a first border line.

8. The vehicle environmental detection system according to claim 6, further comprising the control unit arrangement is adapted to calculate the sets of rotated detections ($d_{horizontal}(k,\beta)$, k=1 ... K) according to:

$$d_{horizontal}(k, \beta) = \begin{bmatrix} \cos(\beta) & -\sin(\beta) \\ \sin(\beta) & \cos(\beta) \end{bmatrix} d(k), 1 \le k \le K$$

where $d_{horizontal}(k, \beta)$ is detection d(k) rotated by the reference angle, $\beta$ is the reference angle, K is the number of detections, and d(k) is a detection in the set of detections (d(k), k=1 ... K).

9. The vehicle environmental detection system according to claim 6, further comprising the control unit arrangement is adapted to calculate the set of slant rotated detections ($d_{slant}(k,\alpha)$) according to:

$$d_{slant}(k, \alpha) = \begin{bmatrix} \cos(\alpha) & -\sin(\alpha) \\ \sin(\alpha) & \cos(\alpha) \end{bmatrix} d_{horizontal}(k, \beta), 1 \le k \le K$$

where $d_{slant}(k,\alpha)$ is the k-th slant rotated detection.

10. A method for a vehicle environmental detection system in an ego vehicle, where the method comprises the steps of:
obtaining a plurality of detections forming a set of detections (d(k), k=1 ... K) for determining a slant angle, for each of the slant angle in a set of slant angles ($\alpha_n$, n=1 ... N), calculating a set of slant rotated detections ($d_{slant}(k,\alpha_n)$, k=1 . . . K) from the set of detections (d(k), k=1 . . . K) and a present slant angle;

calculating a projection profile ($P_{row}$) for the slant rotated detections ($d_{slant}(k, \alpha_n)$, k=1 . . . K) comprising a histogram; and calculating an entropy ($H_{row}$) for the histogram; and determining for which of the slant angle the entropy ($H_{row}$) reaches a minimum based on the calculated entropy ($H_{row}$).

11. The method according to claim 10, further comprising calculating the projection profile value for a j-th histogram bin ($P_{row}(j, \alpha_n)$) according to the following equation:

$$P_{row}(j, \alpha_n) = \sum_{k=1}^{K} \begin{cases} 1 & \text{if } (j-1)W < \{x - \text{coordinate of } (d_{slant}(k, \alpha))\} < jW \\ 0 & \text{else} \end{cases},$$

where $P_{row}(\alpha_n)$ is determined by the projection profile values for j=1 . . . B, and parameters B and W are each a pre-determined range of the histogram and width of a histogram bin respectively.

12. The method according to claim 10, further comprising calculating the entropy ($H_{row}(\alpha_n)$) for the projection profile ($P_{row}(\alpha_n)$) as a function of the slant angle ($\alpha_n$) for each histogram according to:

$$H_{row}(\alpha_n) = -\sum_{j=1}^{B} P_{row}(j, \alpha_n) \log_2(P_{row}(j, \alpha_n))$$

where $H_{row}(\alpha_n)$ is the entropy associated with the slant angle $\alpha_n$, and B is the number of bins in the determined histogram associated with the slant angle $\alpha_n$.

13. The method according to claim 10, further comprising a majority of the plurality of detections is associated with vehicles in a parking row, where the slant angle for which the entropy ($H_{row}(\alpha_n)$) reaches a minimum is constituted by a correct slant angle which constitutes a measure of a slant angle between a common orientation of the vehicles and a reference line.

14. The method according to the method claim 10, further comprises applying an initial rotation to the set of detections (d(k), k=1 . . . K) by a reference angle (β) such that a set of the rotated detections ($d_{horizontal}(k, \beta)$, k=1 . . . K) is obtained, where the control unit arrangement is adapted to calculate the sets of slant rotated detections ($d_{slant}(k,\alpha_n)$, k=1 . . . K) from the set of rotated detections ($d_{horizontal}(k, \beta)$, k=1 . . . K), where the sets of rotated detections ($d_{horizontal}(k,\beta)$, k=1 . . . K) are calculated according to:

$$d_{horizontal}(k, \beta) = \begin{bmatrix} \cos(\beta) & -\sin(\beta) \\ \sin(\beta) & \cos(\beta) \end{bmatrix} d(k), 1 \le k \le K$$

where $d_{horizontal}(k, \beta)$ is detection d(k) rotated by the reference angle, β is the reference angle, K is the number of detections, and d(k) is a detection in the set of detections (d(k), k=1 . . . K), and where the set of slant rotated detections ($d_{slant}(k,\alpha)$) is calculated according to:

$$d_{slant}(k, \alpha) = \begin{bmatrix} \cos(\alpha) & -\sin(\alpha) \\ \sin(\alpha) & \cos(\alpha) \end{bmatrix} d_{horizontal}(k, \beta), 1 \le k \le K$$

where $d_{slant}(k,\alpha)$ is the k-th slant rotated detection.

* * * * *